United States Patent
Shimizu et al.

[15] 3,661,536
[45] May 9, 1972

[54] TUNGSTEN MATERIALS

[72] Inventors: Shogo Shimizu, Chigasaki-shi; Takami Motose, Atsugi-shi; Syu Yamazaki, Tokyo; Michiyasu Komatsu; Hiroshi Yamamoto, both of Yokohama-shi, all of Japan

[73] Assignee: Tokyo Shibaura Electric Co., Ltd., Kawasaki-shi, Japan

[22] Filed: Sept. 10, 1969

[21] Appl. No.: 856,572

Related U.S. Application Data

[63] Continuation-in-part of Ser. No. 596,227, Nov. 22, 1966, abandoned.

[30] Foreign Application Priority Data

Mar. 11, 1966 Japan.....................................41/14638
Mar. 14, 1966 Japan.....................................41/15708

[52] U.S. Cl...................................29/182, 75/176, 75/207, 313/311
[51] Int. Cl. ........................................................B22f 3/12
[58] Field of Search..............................29/182; 75/207, 176

[56] References Cited

UNITED STATES PATENTS

| | | |
|---|---|---|
| 2,030,229 | 2/1936 | Schwarzkopf..........................75/176 |
| 2,600,995 | 6/1952 | Kurtz.........................................75/176 |
| 3,177,076 | 4/1965 | Timmons et al. ........................75/176 |
| 3,357,819 | 12/1967 | Landsberg................................75/176 |

*Primary Examiner*—Carl D. Quarforth
*Assistant Examiner*—B. H. Hunt
*Attorney*—Flynn & Frishauf

[57] ABSTRACT

Tungsten materials prepared by adding during the manufacture of powdered tungsten 0.01 to 2.0 percent by weight of aluminum oxide ($Al_2O_3$), silicon dioxide ($SiO_2$) or potassium monoxide ($K_2O$) singly or in combination on the basis of the tungsten, and 0.005 to 0.5 percent by weight of cobalt (Co) or tin (Sn) singly or in combination on the basis of the tungsten in such a manner that after mixture is sintered into a plate or wire, the final composition thereof comprises 0.0001 to 0.05 percent by weight of aluminum (Al), silicon (Si) or potassium (K) singly or in combination and 0.002 to 0.5 percent by weight of cobalt (Co) and/or 0 to 0.0005 percent by weight of tin (Sn) and tungsten and minute amounts of impurities as the remainder.

6 Claims, 22 Drawing Figures

FIG. 20A  FIG. 20B
FIG. 21
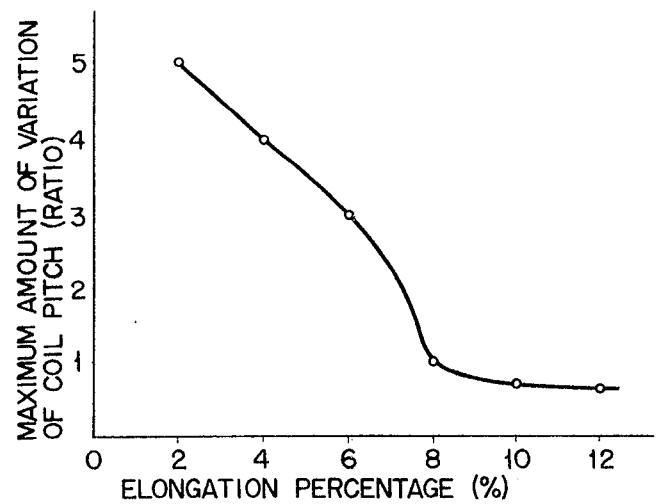

TUNGSTEN MATERIALS

CROSS REFERENCES TO THE RELATED PATENT APPLICATION

This is a continuation-in part of the U.S. Pat. Ser. No. 596,227, filed on Nov. 22, 1966 now abandoned.

BACKGROUND OF THE INVENTION

This invention relates to tungsten materials having improved ductility, a method of preparing the same and structural parts made of these materials.

The tungsten materials of this invention can be used for such applications as filaments for shock-or vibration-proof electric bulbs, cathode heater elements for electronic discharge tubes, grid electrodes for electronic tubes and filaments for common electric tubes and bulbs, which are required to have high resistance to high temperature deformation, shock-or vibration-proof strength and good shaping properties.

In connection with researches on tungsten materials for such applications, there have been developed a number of tungsten materials but none of them are fully satisfactory. The tungsten materials heretofore known include, for example, the type consisting of pure tungsten blended with aluminum oxide ($Al_2O_3$), silicon dioxide ($SiO_2$) or potassium monoxide ($K_2O$) which are known to be common doping agents, or the type blended with thorium dioxide ($ThO_2$) or zirconium dioxide ($ZrO_2$) in order to improve the thermal electron emissive properties for use as cathode electrodes of signal transmission tubes and the like, the type similarly consisting of pure tungsten alloyed with rhenium (Re) or molybdenum (Mo), or mixed with zirconium dioxide ($ZrO_2$) and an element or elements of Group VIII such as iron (Fe), nickel (Ni), etc., and the type consisting of pure or thoriated tungsten blended with an element or elements of Group VIII such as iron (Fe), nickel (Ni) and the like.

These prior art tungsten materials, however, contain common doping agents for the purpose of improving the thermal electron emissive properties or the sagging properties by adjusting the particle size of recrystallized grains of tungsten.

Wires made of the aforementioned tungsten materials indeed have a sufficiently satisfactory high temperature sagging-proof properties to be used in general electric lamps without any appreciable difficulties. But they have the drawbacks that as they become very brittle, heater wires consisting thereof are liable to be broken, greatly reducing the useful life of electric tubes and bulbs, for example, shock-proof electric lamps, head lamps of motor cars and the like, where the vibration-proof strength of said tungsten material after recrystallization, especially at room temperature, is of prime importance.

Even when attempts are made to improve the ductility of tungsten wires by annealing them at a temperature below that of recrystallization, the rate of elongation tends to gradually decrease with increasing annealing temperature so that where structural parts of electronic tubes and infrared ray lamps which should be operated at a temperature below that of recrystallization of tungsten materials, say, in a range from 1,000° to 1,700° C, include tungsten wires prepared by the prior art, then there often occurs the failure of said tubes and lamps due to the breakage of the tungsten wire caused by embrittlement.

Further, these tungsten materials are difficult to shape and work owing to their high hardness and poor ductility although their mechanical strength is generally high.

For example, where a cathode electrode for indirectly heated type electronic tubes is fabricated by inserting a heater element in a cathode sleeve, it is required to use a heater element which is formed by bending a tungsten wire to correspond to the configuration and dimensions of the cathode sleeve. However, when so bending the heater element crack or breakage is liable to be formed at the bent which results in the embrittlement and breakage of wire during the use of the cathode electrode. By this reason it is common to bend the heater at an obtuse angle but with this construction the legs of the heater element are separated too widely with the result that an undesirable contact between the heater element and the inner surface of the sleeve is unavoidable. This will cause a surface coating consisting of alundum and the like deposited on the heater element to peel off, and such a heater element must be discarded. As is well known in the art the characteristics and useful life of electronic tubes largely depend upon the quality of cathode heaters.

SUMMARY OF THE INVENTION

This invention contemplates to eliminate the various prior art difficulties mentioned above and has its principal object to provide improved tungsten material having sufficient ductility and flexibility before and after recrystallization.

Another object of this invention is to provide tungsten material which has excellent workability at the time of drawing, bending and winding operations during shaping.

Still another object of this invention is to provide a method of working tungsten material having such excellent ductility as to exhibit at least more than 10 percent elongation at room temperature at the time of working.

Yet another object of this invention is to provide structural parts made of the above mentioned tungsten material.

The above and further objects together with other features and advantages of this invention will be better understood from the following description.

Generally stated, the tungsten material of this invention is characterized by consisting of tungsten or tungsten trioxide added with aluminum oxide ($Al_2O_3$), silicon dioxide ($SiO_2$) and potassium monoxide ($K_2O$), singly or in combination, which are known in the art as doping materials and further added both with cobalt (Co) and tin (Sn) having a slight solid solution effect with respect to tungsten.

Briefly speaking, the tungsten materials of the present invention are prepared by adding during the manufacture of powdered tungsten aluminum oxide ($Al_2O_3$), silicon dioxide ($SiO_2$) or potassium monoxide ($K_2O$) in amounts of 0.01 to 2.0 percent by weight singly or in combination on the basis of the tungsten, and cobalt (Co) or tin (Sn) in amounts of 0.005 to 0.5 percent by weight singly or in combination on the basis of the tungsten in such a manner that after the mixture is sintered into a plate or wire, the final composition thereof comprises 0.0001 to 0.05 percent by weight of aluminum (Al), silicon (Si) or potassium (K) singly or in combination and 0.002 to 0.5 percent by weight of cobalt (Co) and/or 0 to 0.0005 percent by weight of tin (Sn) and tungsten and minute amounts of impurities as the remainder. However, where analysis is not carried out with high precision, the content of tin may sometimes not be detected. Main impurities contained in the tungsten material consist of iron, nickel and molybdenum contained in the tungsten ore or iron-manganese scheelite, and iron nickel carried into the tungsten powders from an iron or nickel boat used in the reduction process. These impurities can be detected to an extent of about 0.001 percent by weight using an ordinary analytical method. Referring to iron and nickel, they are not only carried into the tungsten as impurities during the refining process, but also are intentionally added with cobalt (Co) and tin (Sn) for the same purpose for which the last mentioned materials are blended.

While addition of iron or nickel does not display so prominent an effect as that of cobalt or tin, the amount of cobalt, tin, iron or nickel added singly or in combination not in excess of 0.005 to 0.5 percent by weight will not obstruct the effect of the present invention.

Incorporation of only iron or nickel in a general doping agent without adding cobalt or tin is obviously outside the scope of the present invention. It should be understood, however, that the intentional blending of iron or nickel in addition to cobalt or tin or the unintentional presence of iron or nickel as an impurity is construed to fall within the scope of the invention. Namely, the point of the invention is addition of cobalt or tin, so that extra inclusion of other doping agents to an extent not detrimental to the object of the invention is covered by its scope.

The tungsten material having the above mentioned composition has extremely high ductility before recrystallization and it has been found that by suitable selection of the ratio of the composition it is possible to obtain materials having an elongation as high as 20 percent.

The tungsten materials of the above composition are characterized by being capable of increasing the recrystallization temperature, and decreasing the ductile-brittle transition temperature down to a value near a normal temperature.

However, after recrystallization, although the elongation of the tungsten materials having the above mentioned composition is far larger than that of the prior art tungsten materials the elongation is not so large as that of tungsten before recrystallization. As a result, where the novel tungsten materials are utilized to produce structural parts which operate at temperatures above the recrystallization temperature, it is necessary to increase the recrystallization temperature beyond the operating temperatures when it is required to provide the maximum elongation at the operating temperature. In the novel tungsten materials it is possible to attain this object by suitably controlling the annealing temperature as well as the degree of working during the wire drawing operation by utilizing their unique property of elongation. Such a method of working will be described later more in detail.

BRIEF EXPLANATION OF THE DRAWINGS

This invention can be more fully understood from the following description taken in connection with the accompanying drawings, in which:

FIG. 20A and 20B show side views showing the deformation of the coil after 200 hours of a forced life-interrupting test; and FIG. 21 is a curve diagram showing the maximum variation in the coil pitch after 200 hours of a forced life-interrupting test.

DETAILED DESCRIPTION OF THE INVENTION

Figure 1:
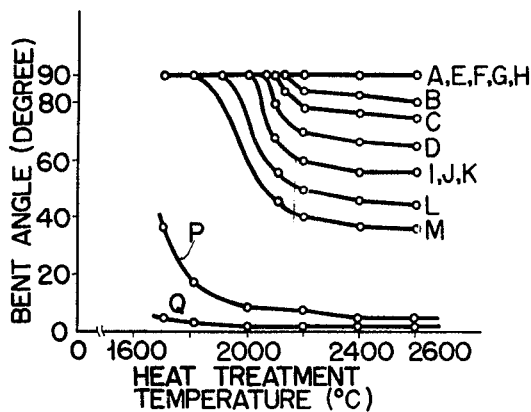
FIG. 1 is a graph comparing the heat treatment viz. bent angle characteristics of the novel tungsten material and the prior art tungsten material.

The characteristics of the novel tungsten materials and a method of preparing the same will now be described.

EXAMPLE 1

1. 10 Kg of tungsten trioxide powder was prepared by a conventional method.

2. Then a mixed solution was prepared consisting of 1,000 cc of aluminum chloride solution (aluminum chloride 25g/l), 1,000cc of potassium silicate solution (potassium silicate 103g/l), 500cc of potassium chloride solution (potassium chloride 10g/l), 93 cc of cobalt nitrate solution (cobalt nitrate 100g/l), and 50 cc of stannous chloride solution (stannous chloride 100g/l).

3. Tungsten trioxide powder and said mixed solution were put in a suitable evaporating dish and were then evaporated and dried until the entire amount of the moisture content was removed, thus obtaining tungsten powder containing 0.1 percent by weight of aluminum oxide ($Al_2O_3$), 0.5 percent by weight of silicon dioxide ($SiO_2$) and 0.5 percent by weight of potassium monoxide ($K_2O$), which are the common doping agents, and 0.04 percent by weight of cobalt (Co) and 0.04 percent by weight of tin (Sn).

4. Thereafter, the dry powder thus obtained was placed in a nickel boat and reduced in a dry hydrogen furnace at a temperature of from 700° to 850° C.

5. Then undesired impurities in the reduced powder were removed and the powder was then washed with mixed acid consisting of hydrofluoric acid, hydrochloric acid to activate the powder. Then the powder was washed several times with warm water and dried to obtain powder of metallic tungsten (about 7.9 Kg).

6. Then the powder of metallic powder was formed into wires. More particularly, 600g of tungsten powder was placed in a metal mold having approximate dimensions of 10 × 10 × 600 mm and press formed under a pressure of about 1.5 tons/cm².

7. Then the pressed body of powder was presintered at a temperature of 1,200° C in a dry hydrogen furnace in order to provide a strength which is sufficient to readily handle the shaped mass.

8. The presintered body of tungsten powder thus obtained was sintered by passing therethrough a current of a magnitude corresponding to 90 percent of its fusion current, i.e., of about 2,500 to 2,600 amperes (corresponding to 3,000° C) for 10 minutes. The density of the sintered tungsten material thus produced amounted to about from 90 to 93 percent of the theoretical density.

9. Then, by a series of conventional treatments including swaging and drawing, a wire having required dimensions was prepared. For example, swaging operation was continued at a temperature of from 1,300° to 1,600° C until the diameter was reduced to 2.0 mm and then the wire was drawn through a die at a temperature of from 500° to 900° C to produce a tungsten wire having the desired dimensions.

The aforesaid acid washing step of item 5 is not always required depending on the application in which the tungsten material is used. However, said step is effective where there is to be produced tungsten for use as a filament.

While the above-listed items 1 to 5 substantially cover the method of preparing powdered tungsten metal, they are not particularly novel in any way, but there may be practised many modifications thereof.

For example, i. In the step of item 3 the mixed solution of additives was added to tungsten trioxide. However, said solution may be added to tungstic acid ($WO_3 \cdot H_2O$) or an oxide of tungsten having a composition of $W_4O_{11}$.

ii. Addition of doping agents such as $Al_2O_3$, $SiO_2$, $K_2O$, Co and Sn may be made in the form of single metal or compounds. Namely, there may be used other compounds, i.e., aluminum chloride and aluminum nitrate for $Al_2O_3$; potassium silicate for $SiO_2$; potassium chloride and potassium silicate for $K_2O$; cobalt nitrate and cobalt chloride for Co; and stannous chloride and glycol tin for Sn.

What calls for care where the aforesaid doping agents are added in the form of compounds is that the amount of $Al_2O_3$, $SiO_2$ or $K_2O$ added singly or in combination be limited to 0.01 to 2 percent by weight on the basis of the tungsten and that the amount of Co or Sn added singly or in combination be limited to 0.005 to 0.5 percent by weight on the basis of the tungsten.

iii. The time of adding Co or Sn is not particularly specified. Namely, said addition may be made with that of $Al_2O_3$, $SiO_2$ or $K_2O$ (the foregoing example corresponds to this case), or to powdered tungsten after reduction (step of item 4 in said example) or to powdered tungsten which has been reduced and acid washed (step of item 5 in said example).

iv. All that is required in adding Co or Sn as a single metal to the powdered tungsten is to mix them thoroughly. Where, however, such addition is made in the form of a solution of compounds such as cobalt nitrate or stannous chloride, it is necessary further to dry the mixture. When said drying is to be conducted in an oxidizing atmosphere such as air, it is subsequently required to reduce the mixture in a reducing atmosphere such as hydrogen.

TABLE 1

Percent by weight of additives

| Sample | $Al_2O_3$ | $SiO_2$ | $K_2O$ | Co | Sn | Fe | Ni |
| --- | --- | --- | --- | --- | --- | --- | --- |
| A | 0.1 | 0.5 | 0.5 | 0.04 | 0.04 | 0 | 0 |
| B | 0.1 | 0.5 | 0.5 | 0.03 | 0.03 | 0 | 0 |
| C | 0.1 | 0.5 | 0.5 | 0.06 | 0.01 | 0 | 0 |
| D | 0.03 | 0 | 0 | 0.1 | 0.1 | 0 | 0 |
| E | 0.1 | 0.5 | 0.5 | 0.03 | 0.4 | 0 | 0 |
| F | 0.1 | 0.5 | 0.5 | 0.06 | 0 | 0 | 0 |
| G | 0.1 | 0.5 | 0.5 | 0.04 | 0 | 0.03 | 0 |
| H | 0.1 | 0.5 | 0.5 | 0.04 | 0 | 0 | 0.03 |
| I | 0.1 | 0.5 | 0.5 | 0.4 | 0.1 | 0 | 0 |
| J | 0.1 | 0.5 | 0.5 | 0.2 | 0.2 | 0 | 0 |
| K | 0.1 | 0.5 | 0.5 | 0.5 | 0 | 0 | 0 |
| L | 0.1 | 0.5 | 0.5 | 0 | 0.03 | | |
| M | 0.1 | 0.5 | 0.5 | 0.003 | 0.005 | 0 | 0 |
| N | 0.1 | 0.5 | 0.5 | 1.0 | 0 | 0 | 0 |
| O | 0.1 | 0.5 | 0.5 | 0 | 1.0 | 0 | 0 |
| P | 0.04 | 0.5 | 0.5 | 0 | 0 | 0 | 0 |
| Q | 0 | 0 | 0 | 0 | 0 | 0 | 0 |

Table 1 above presents many examples where there was added the doping agents in varying amounts.

Samples A to M represent tungsten materials according to the present invention, N and O those outside of the invention where the addition of cobalt and tin exceeded the range specified by the invention, and P and Q the prior art tungsten materials. Sample P is the tungsten mateial prepared by only adding general doping agents such as $Al_2O_3$, $SiO_2$ and $K_2O$, and sample Q is tungsten as a single metal. Sample A denotes the tungsten material of the type described in Example 1. The tungsten materials listed in Table 1 above were all prepared in the same manner as in Example 1.

There will now be described the properties of the tungsten materials given in Table 1 with reference to the appended drawings.

FIG. 1 shows values of bent angle of various samples which were measured at 25° C (normal temperature) for wires of 0.35 mm diameter made of respective samples which had been undergone heat treatments at different temperatures and tested by a 90° maximum bending testing machine. As can be clearly noted from FIG. 1 samples P and Q which are made of prior art tungsten materials are brittle so that they can be scarcely bent after recrystallization treatment whereas samples A,B,C,D,E,F,G,H,I,J,K,L and M made of the novel tungsten materials added with the doping agents in addition to cobalt (Co) and tin (Sn) have large bent value at normal temperature and exhibit very good ductility even after they had been annealed at a temperature of from 2,000° to 2,100° C and recrystallized.

Samples N and O contained excess amounts of Co and Sn respectively and became brittle after sintering, failing to be processed into wires. Accordingly, they are not presented in FIG. 1.

Figure 2:
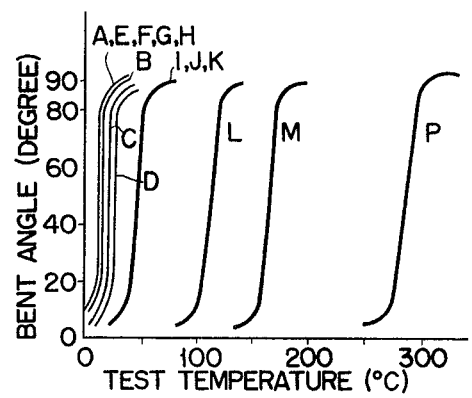
FIG. 2 is a graph comparing the testing temperature viz. bent angle characteristics.

FIG. 2 shows the results of measurements of bent angles of wires of 0.30 mm which have been treated at different treating temperatures, said measurement has been conducted at various testing temperatures by means of a bending testing machine provided with a refrigerating and heating chambers. This figure also shows ductile-brittle transition temperature. The results of the aforementioned test on the main samples are given in Table 2 below.

TABLE 2

| Sample | Heat treatment temperature (recrystallization temp.) °C | Ductile-brittle transition temperature °C |
| --- | --- | --- |
| A | 2100 | 10 – 15 |
| B | 2100 | 10 – 15 |
| C | 2100 | 10 – 15 |
| D | 2000 | 15 – 20 |
| P | 2000 | 270 – 290 |

As is evident from FIG. 2 and Table 2, the prior tungsten material (Sample P) which was annealed at 2,000° C and recrystallized at 300° C had an increased transition temperature as high as 300° C so that it was very brittle and could not be bent at room temperature. Accordingly, as the filament made of the tungsten wire made of the Sample P is very brittle after recrystallization it is very brittle at room temperature and will be fractured or broken even under small stress. Whereas in the tungsten wires embodying this invention (Samples A,B,C and D) the transition temperature decreases to an extremely low value, i.e., 10° – 15° C so that they are quite ductile at normal temperatures thus insuring very easy working.

Figure 3:
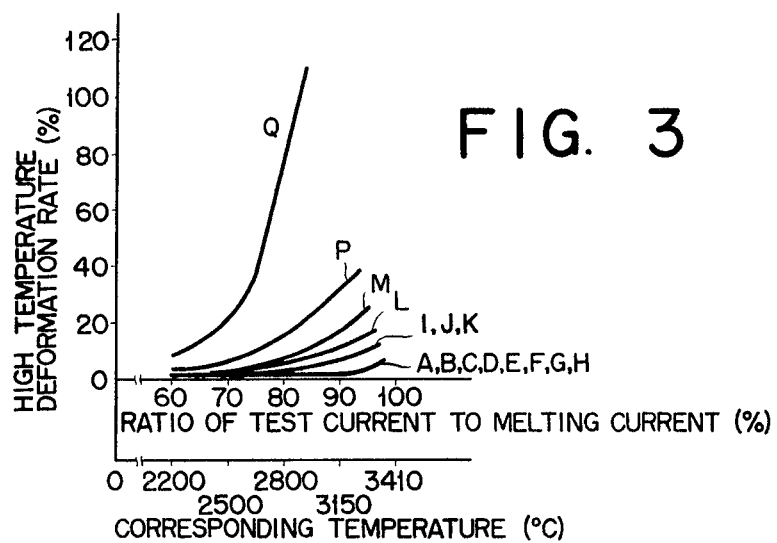
FIG. 3 is a graph comparing the test current viz. high temperature deformation rate.

FIG. 3 shows the results of a test wherein tungsten wires of 0.35 mm diameter were shaped into hair-pin configuration and the value of current passing through each of the hair-pin shaped samples was varied to measure the percentage of deformation of each sample. These curves also show the sagging characteristic. As can be clearly noted from FIG. 3, with tungsten wires A,B,C,D,E,F,G and H, at a value corresponding to 90 percent of fusion current the percentage of deformation is zero and is less than only 2 to 3 percent even at 95 percent, which shows that the sagging characteristic of the filament made of the novel tungsten material is extraordinary excellent.

Figure 4:
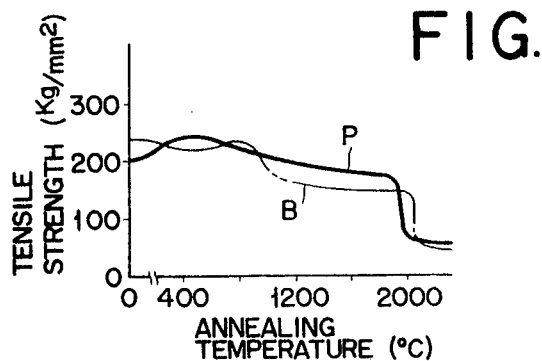
FIG. 4 is a graph showing the comparison between annealing temperature viz. tensile strength characteristics.
Figure 5:
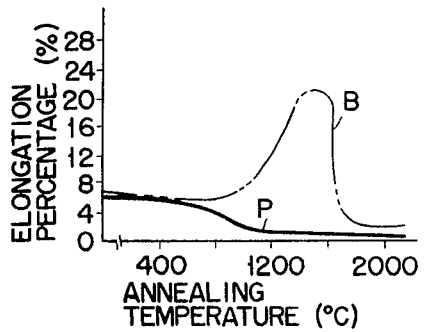
FIG. 5 is a graph showing the comparison between the annealing temperature viz. elongation characteristics.

FIGS. 4 and 5 represent tensile strength and elongation, respectively, of various samples of wires of 0.35 mm diameter each measured at a normal temperature of 25° C, which were not heat treated after drawing and were annealed at 25° C, respectively, after drawing.

FIG. 4 shows that the annealing temperature, at which the tensile strength sharply decreases, of the tungsten wire (Sample B) of this invention is about 2,100° C which is to be compared with that of the conventional tungsten wire (Sample P).

In other words this invention provides tungsten wires having higher recrystallization temperatures. Further, FIG. 5 shows that the elongation of the Sample B before recrystallization is very large which could not be expected in the prior art tungsten wires. Especially, where the tungsten wire is annealed at a temperature within a range of from 1,200° to 1,700° C, it will exhibit elongation compatible with that of molybdenum wire, that maximum elongation being about 20 percent. From this it will be noted by those skilled in the art that tungsten wires embodying this invention have extremely good workability so that they are quite suitable for use to fabricate heaters for electronic tubes which are generally operated at temperatures below 1,700° C.

Figure 6:
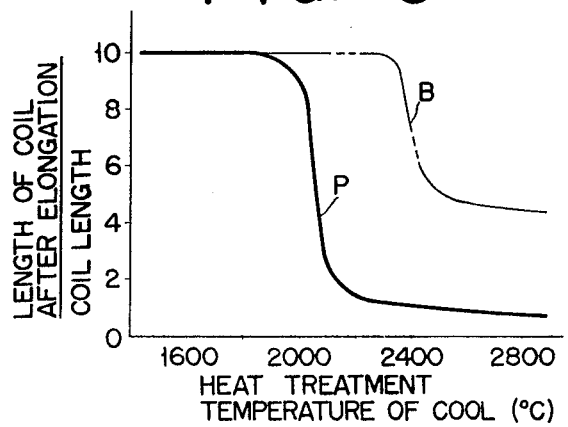
FIG. 6 is a graph showing the comparison between the results of coil pulling tests.

Turning now to FIG. 6, there is shown results of coil elongation tests wherein coils of 2.0 mm diameter for infrared rays lamps for use in foot warmers were prepared by winding tungsten wires of Samples B and P each having a dimension of MG 15.1 and then respectively heat treated at various temperatures, said tests having been conducted at a normal temperature of 25° C. The ordinate indicates a multiple of quantity obtained by dividing the elongated length of the coils when breakage of wire occurred with the coil length under zero stress whereas the abscissa represents the treating temperature, provided that when the coils elongated without breakage and then restored to the original wire state, the length of the wire would be ten times longer than that of the coil under zero stress. It is evident from FIG. 6 that when the prior art tungsten wire (Sample P) is heat treated at a temperature above about 2,100° C, it will rapidly become brittle to render it impossible to elongate the coil to any appreciable amount. Stated another way, even when a very small stress is applied, it will become brittle, thus causing breakage of the wire. On the contrary tungsten wires embodying this invention can be elongated to a length at least 10 times longer. Especially the tungsten wire (Sample B) added with both cobalt (Co) and tin (Sn) shows an elongation of five times larger than the coil length under zero stress even when it is heat treated at a temperature above 2,500° C.

This shows that the tungsten wires of this invention have extremely high ductility which renders them most suitable as the filament material utilized in vibration-proof lamps and head lights for motor cars in which the antivibration strength is of the prime importance.

As can be noted from various test results mentioned above, tungsten materials embodying this invention have greatly improved sagging characteristics as well as very good ductility.

The first reason for this is that the crystal structure of tungsten after the first recrystallization is such that the addition of aluminum oxide ($Al_2O_3$), silicon dioxide ($SiO_2$) and potassium monoxide ($K_2O$) which are generally known as common doping materials is effective to produce elongated crystals which are combined in zig-zag form by the doped tube effect, thus contributing to the improvement of the sagging characteristic.

Secondly, it was inevitable that tungsten wires prepared by the conventional powder metallurgies contained a large quantity of oxygen, there was a strong tendency of embrittlement of tungsten wires owing to the precipitation of oxygen at the interfaces of crystals or in the crystal defects. However, in accordance with this invention addition of tin (Sn) having a strong affinity towards oxygen is effective to cause deoxidation during the sintering step whereby to reduce the quantity of oxygen included in tungsten. In addition, cobalt (Co) addition to tungsten serves to effectively decrease the concentration of oxygen or carbon contained in tungsten at the grain boundaries or at the point defects and dislocations, thus greatly improving the property of matrix without accompanying undue hardening of the solid solution. This, in turn, contributes to the lowering of ductile-brittle transition temperature of tungsten thereby greatly increasing ductility.

As previously described, the tungsten material of the present invention is prepared by added to the raw tungsten doping agents such as $Al_2O_3$, $SiO_2$ or $K_2O$ in amounts of 0.01 to 2.0 percent by weight singly or in combination on the basis of the tungsten and Co or Sn in amounts of 0.005 to 0.5 percent by weight singly or in combination on said basis. However, these doping agents excluding Co are almost lost during the processes of reducing the tungsten oxides and acid washing and sintering the reduced tungsten powder. Namely, $Al_2O_3$ and $SiO_2$ and $K_2O$ substantially disappear during the reducing, acid washing and particularly sintering processes, so that there can be only defected extremely minute amounts thereof in the final product, for example, the one drawn into wires.

When determined by spectroscopic quantitative analysis, the residual contents of jointly added Al, Si and K in a tungsten filament only totaled 1 to 500 ppm or 0.0001 to 0.05 percent by weight, i.e., 1 to 100 ppm of Al, 20 to 200 ppm of Si and 20 to 200 ppm of K. It is supposed that such minute remnants of these dopants can still enable the recrystallized grains of the tungsten material to be properly conditioned and allow it to develop good sagging-proof properties. While Co is partly lost during the process of sintering powdered tungsten, 50 to 95 percent of the initially added amount thereof is retained. Generally, the content of Co in the sintered product is about 0.002 to 0.5 percent by weight. Referring now to Sn, it is little lost in a powdered state, but has strong affinity for oxygen and displays a deoxidizing effect, so that almost all of it is lost while the powdered tungsten is being sintered. The residual content of Sn in the sintered product is too minute to be analyzed with the accuracy possible at the present time. Although it is not yet exactly defined, said content is supposed to range from 0 to 0.0005 percent by weight.

Spectroscopic quantitative analysis was made for the content of dopants in the raw powdered tungsten and wires processed therefrom with respect to, for example, Sample P (prior art tungsten material) and Sample B (tungsten material of the present invention), using an analytical apparatus having a maximum sensitivity of 10 ppm, the results being presented in Table 3 below.

TABLE 3

| Sample | | Values of analysis (ppm) | | |
|---|---|---|---|---|
| | | Al | Co | Sn |
| B | raw material powder | 93 | 300 | 280 |
| | wire | 14 | 230 | less than 10 |
| P | raw material powder | 35 | less than 10 | less than 10 |
| | wire | less than 5 | less than 10 | less than 10 |

This table shows that the element tin (Sn) which had been added to the novel tungsten material (Sample B) might have functioned as a deoxidizing agent so that but a little amount of oxygen remains.

The quantities of cobalt (Co) and tin (Sn) which are so effective to improve ductility will now be considered.

Figure 7:
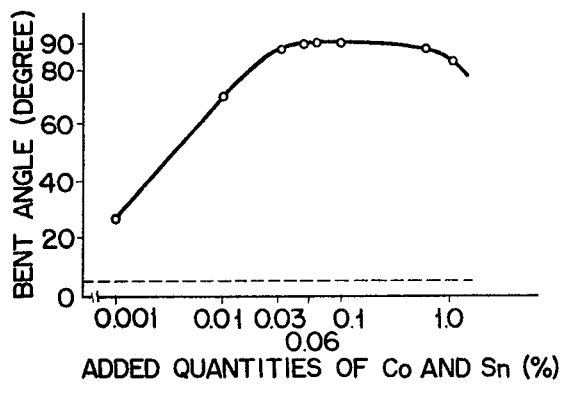
FIG. 7 is a plot showing the relation between the quantities of cobalt (Co) and tin (Sn) added and the bent angle of the novel tungsten material.

FIG. 7 shows the results of bending tests at room temperature made on wires of 0.35 mm diameter and consisting of tungsten materials containing constant quantities of 0.1 percent of aluminum oxide ($Al_2O_3$), 0.5 percent of silicon dioxide ($SiO_2$), 0.5 percent of potassium monoxide ($K_2O$) and varying quantities of cobalt (Co) and tin (Sn). The tests were carried out at normal temperature after heat treatment (recrystallization) at 2,100° C.

Figure 8:
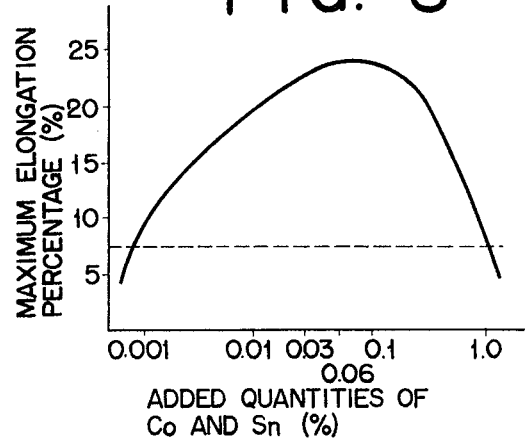
FIG. 8 is a plot showing the relation between the quantities of cobalt (Co) and tin (Sn) added and the maximum elongation.

FIG. 8 shows the relation between the maximum elongation and the quantities of cobalt (Co) and tin (Sn) of tungsten wires which were annealed, wherein a solid line represents such relation of the novel tungsten wire while a dotted line that of the prior art tungsten wire.

FIGS. 7 and 8 clearly show that when cobalt (Co) and tin (Sn) are added in a range of from 0.001 to 1.0 percent by weight, the bent angle and elongation are greatly improved over those of the prior tungsten material, that the wires are not broken at an angle of bent of 90° and that elongation can be increased from 10 to 25 percent.

However, when the quantity of cobalt (Co) and tin (Sn) increases to near 1.0 percent, working of the tungsten wire becomes difficult and when the tungsten wire is utilized to manufacture filaments and the like troubles including blackening of electric tubes and bulbs and deterioration of their characteristics are unavoidable. On the other hand when the quantity of cobalt (Co) and tin (Sn) is decreased to as low as 0.001 percent by weight, the elongation characteristics become non-uniform, thus providing an unstable bending property and elongation characteristic. Thus in order to obtain tungsten materials which are easy to work and stable the most suitable range of the quantity of addition of cobalt (Co) and tin (Sn) was found to be within a range of from 0.005 to 0.5 percent by weight.

Where tungsten is formed into tube filaments or heater elements, it is advisable to add to the raw tungsten 0.01 to 2.0 percent by weight of combined $Al_2O_3$, $SiO_2$ and $K_2O$ and 0.01 to 0.1 percent by weight of cobalt on the basis of the tungsten in consideration of the workability and properties of the resultant tungsten material. Tungsten wires used as said filament and heater element have a final composition of 0.0001 to 0.05 percent by weight of combined Al, Si and K, 0.005 to 0.09 percent by weight of Co, and tungsten and impurities as the remainder.

As stated above, the tungsten wires of this invention have extremely low transition temperature (10° to 20° C after recrystallization) and excellent ductility at normal temperature when compared with prior art tungsten wires so that they are quite suitable for use as filaments of tubes and bulbs or heater elements of electronic tubes which are required to have large vibration-proof strength.

Although tungsten materials of this invention are very ductile and suitable for use to make heater elements of electron tubes, the range in which their elongation is remarkable is relatively limited, as shown in FIG. 5. Accordingly, in order to render the materials to have their maximum elongation at the operating temperatures of the constructional parts it is necessary to increase the recrystallization temperature above such operating temperature.

Further, as the tungsten materials are drawn through dies there is a tendency that their ductility is decreased due to hardening during a wire drawing process. Thus, in order to provide tungsten wires having the maximum elongation at the operating temperatures of the structural parts and exhibiting elongation more than at least 10 percent at the time of shaping or working it is necessary to pay due consideration for the method of working.

Such a method of working will now be described in detail by referring to the accompanying drawings.

Figure 9:
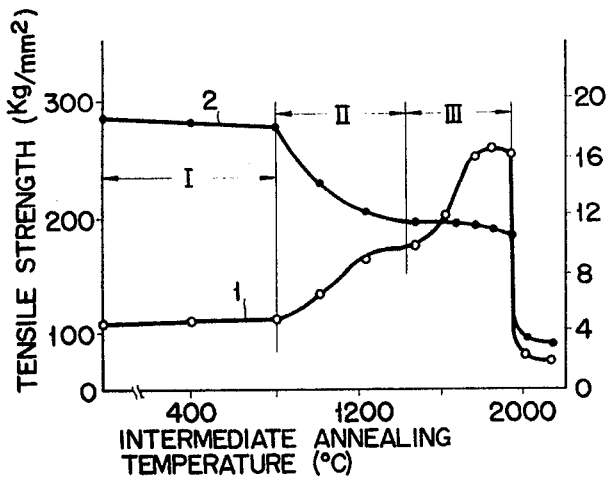
FIG. 9 is a plot showing the relation among the intermediate annealing temperature, tensile strength and elongation.

As shown in FIGS. 4 and 5 the conventional tungsten material (Sample P) decreases elongation and ductility when subjected to annealing, but in the tungsten material (Sample B) according to this invention it is possible to vary its elongation by 4 to 20 percent by varying its annealing temperature. This tendency can also be known from the variation in the tensile strength. However, the tungsten wire exhibiting such a large elongation decreases its ductility when it is reduced to a diameter of 0.18 mm. However such a reduction of ductility could be recovered by subjecting the wire to an intermediate annealing to again increase elongation, as shown by a curve 1 in FIG. 9. The conditions of annealing were that the tungsten wire was heated to the desired temperature by passing electric current directly therethrough and then to pass the wire through a gaseous mixture containing nitrogen ($N_2$) and hydrogen ($H_2$) at a ratio of 90 : 10 at a linear speed of 25 meters/min., and thereafter cooled.

A curve 2 indicates the tensile strength of the wire when measured at room temperature and at a strain rate of $3.3 \times 10^{-2} sec^{-1}$ by means of an Instron type tensile strength testing machine. The elongation and tensile strength measured show characteristic variations in these steps as shown by I, II and III in FIG. 9.

Figure 10:
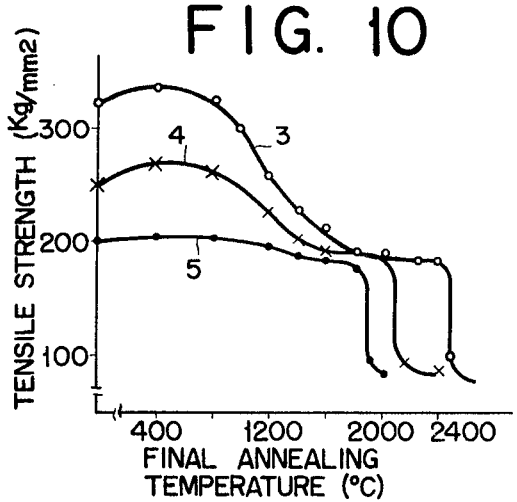
FIG. 10 is a graph showing the relation between the final annealing temperature and tensile strength.
Figure 11:
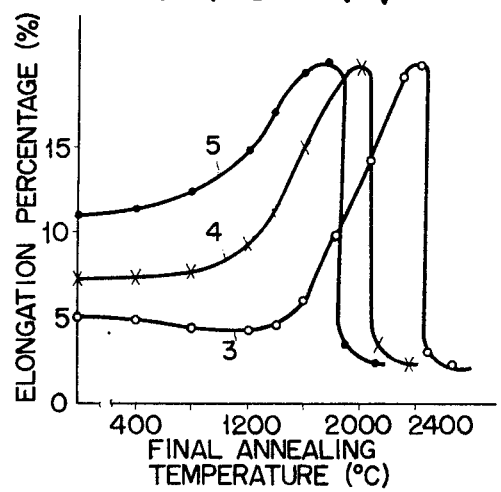
FIG. 11 is a graph showing the relation between the final annealing temperature and elongation.
Figure 12:
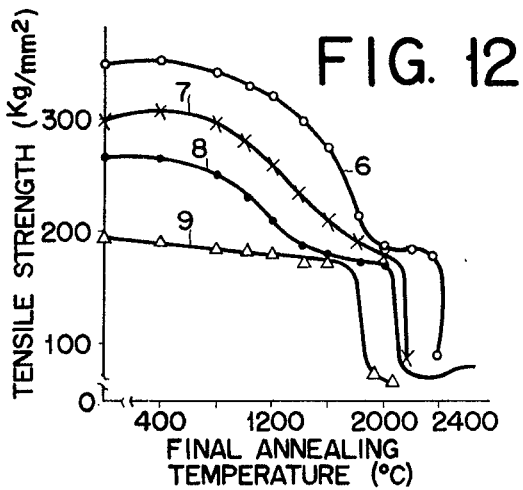
FIG. 12 is a graph showing the relation between the final annealing temperature and tensile strength.
Figure 13:
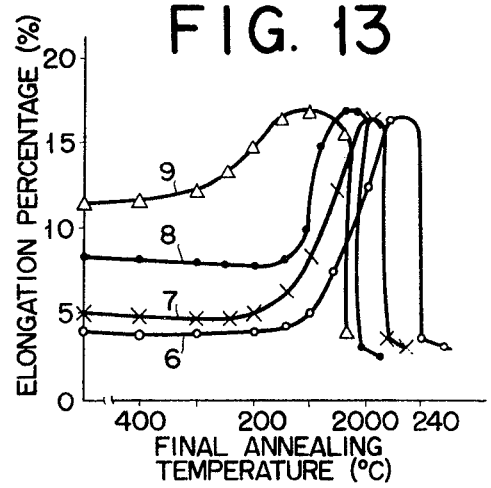
FIG. 13 is a graph showing the relation between the final annealing temperature and elongation.

FIGS. 10 and 11 respectively show the relation of tensile strength and elongation with respect to various final annealing temperatures for wires which have been annealed at different intermediate annealing temperature and then drawn until a cross-sectional area reduction rate of 24 percent was reached.

As can be clearly noted from these figures, tungsten wires having elongation of more than 10 percent are obtainable by using a final annealing temperature of 1,700° to 2,200° C for a tungsten wire 3 which had not been subjected to the intermediate annealing, a final annealing temperature of 1,400° to 2,050° C for a tungsten wire 4 whose intermediate temperature is 1,200° C, and a final annealing temperature of less than 1,850° C for a tungsten wire 5 whose intermediate annealing temperature is 1,700° C.

Similar to FIGS. 10 and 11, FIGS. 12 and 13 respectively show the relation of tensile strength and elongation with respect to various final annealing temperatures for wires which have been annealed at different intermediate annealing temperatures and then drawn until a cross-sectional area reduction rate of 75 percent is reached.

These figures show that in order to produce wires having elongation of more than 10 percent, it is necessary to select the values of final annealing temperatures of from 1,800° to 2,300° C for a tungsten wire 6 which was not subjected to the intermediate annealing, 1,700° to 2,100° C for a tungsten wire 7 whose intermediate annealing temperature is 1,200° C, and 1,600° to 1,900° C for a tungsten wire 8 whose intermediate annealing temperature is 1,700° C. These data mean that it is necessary to use more strict intermediate annealing condition than the cases shown in FIGS. 10 and 11.

In order to limit the required intermediate annealing temperature at relatively low value and to limit the temperature range to a narrow width it is necessary to subject the wire to an intermediate annealing at 1,200° C, thereafter reducing the diameter until a cross-sectional area reducing rate of 50 percent is reached, again anneal it at 1,700° C and finally reduce the diameter of the wire until a cross-sectional area reduction rate of 25 percent is reached as shown by a curve 9.

Figure 14:
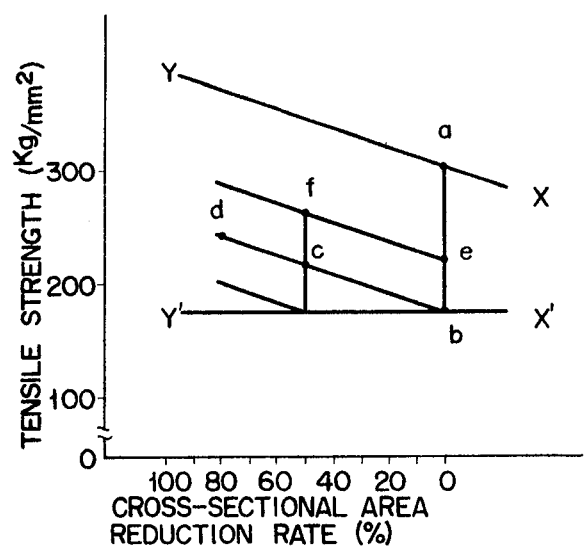
FIG. 14 is a curve showing the relation between the cross-sectional area reduction rate and the tensile strength.

Thus, there is a definite relation among the wire size at which the wires are subjected to the intermediate annealing, the intermediate annealing temperature, and tensile strengths at respective wire sizes. These relations are illustrated in FIG. 14. In this figure the ordinate represents cross-sectional area reduction rates of the tungsten wire by drawing operation. Namely, the figure shows the rate of reduction in the cross-sectional area of a tungsten wire drawn to a size having a certain diameter by the drawing step following the swagging step and subjected to further drawing. The ordinate represents tensile strength.

A straight line X–Y represents the variation in the tensile strength when the wire was not subjected to any intermediate annealing, and a straight line X'–Y' represents a boarder line below which the tensile strength decreases suddenly due to the secondary recrystallization. Accordingly, it is possible to obtain wires of any desired size whose tensile strengths are included between lines X–Y and X'–Y' by merely adjusting the treatments of intermediate annealing.

Figure 15:
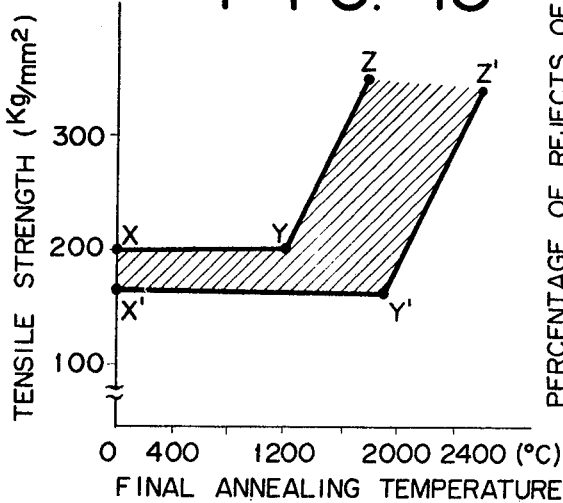
FIG. 15 is a plot showing the relation between the tensile strength and final annealing temperature.

Further, FIG. 15 shows the relation between the tensile strength of finished wires and the annealing temperature which is required to provide finished tungsten wires having elongations of more than 10 percent.

In this figure, a curve X–Y–Z represents the minimum annealing temperature which is necessary to obtain an elongation of more than 10 percent, whereas a curve X'–Y'–Z' represents the upper limit of the annealing temperature. At temperatures above this curve the wires become brittle owing to recrystallization. Thus, it is possible to obtain wires having elongation of more than 10 percent by suitably selecting annealing temperatures contained in the area bounded by curves X–Y–Z and X'–Y'–Z' dependent upon the tensile strength of the finished wire.

Let us consider FIGS. 14 and 15 in more detail. For example, when it is desired to obtain a tungsten wire having elongation of more than 10 percent at the finished size and when subjected to a final annealing temperature of 1,400° to 2,000° C it is evident from FIG. 15 that the tensile strength should be about 230 to 260 Kg/mm². Accordingly, by viewing FIG. 14 it will be evident to those skilled in the art that, it is sufficient to subject a tungsten wire of the size a to an intermediate annealing at 1,700° C, then drawing it through dies until a reduction rate of 80 percent is attained. This is represented by steps indicated by a–b–c–d in FIG. 14. Alternatively, the following method can also be used but actually it is desirable to use a less number of intermediate annealing steps. More specifically, in FIG. 14, the tungsten wire of size a is firstly subjected to an intermediate annealing at 1,200° C, then is drawn until a cross-sectional area reduction rate of 50 percent is attained followed by another intermediate annealing at 1,700° C. Thereafter, the wire is reduced by 30 percent, these steps being represented by a–e–f–c–d in FIG. 14.

FIGS. 14 and 15 clearly indicate that in order to retain necessary ductility during working as well as during operation of the products, in other words to obtain elongation of more than 10 percent, it is necessary to select the reduction rate during drawing and intermediate annealing temperatures so that tungsten wires of the finished size have tensile strength corresponding to the final annealing temperature.

Following are the examples of the method of working the above described tungsten wire.

EXAMPLE 2

A tungsten wire added with 0.1 percent by weight of aluminum oxide ($Al_2O_3$), 0.5 percent by weight of silicon dioxide ($SiO_2$), 0.5 percent by weight of potassium monoxide ($K_2O$), 0.03 percent by weight of cobalt (Co), 0.03 percent by weight of tin (Sn) (each dopant based upon the weight of tungsten) and reduced to have a diameter of 0.18 mm was subjected to an intermediate annealing at 1,200° C followed by drawing at reduction rate of 50 percent or to a wire size of 0.13 mm diameter. After subjecting again the wire to an intermediate annealing at 1,700° C, the wire was drawn at a reduction rate of 30 percent to have the desired diameter of 0.09 mm and then subjected to the final annealing at 1,800° C.

As a result of these treatments the tungsten wire was imparted a sufficient ductility that ensured elongation of more than 10 percent not only during wire drawing operation but also at the operating temperatures of the products, thus substantially eliminating faults such as breakage of the wire.

EXAMPLE 3

A tungsten wire having the same composition as that of Example 2 and worked to have a diameter of 0.18 mm was subjected to an intermediate annealing at a temperature of 1,700° C and then drawn through dies until a cross-sectional area reduction rate of 80 percent was reached to obtain a wire having a diameter of 0.09 mm. This wire showed an elongation more than 10 percent after final annealing carried out at a temperature within a range of 1,400° to 2,000° C.

As has been fully described the tungsten materials according to this invention can exhibit an elongation of more than 10 percent during working and use when the materials are worked according to the working process described above.

Following are the examples of the method of manufacturing heater elements for electron tubes, filaments of infrared lamps for use in foot warmers and the like structural products by utilizing the above described novel tungsten material and the method of working the same.

EXAMPLE 4

0.01 percent by weight of aluminum oxide ($Al_2O_3$), 0.5 percent by weight of silicon dioxide ($SiO_2$), 0.5 percent by weight of potassium monoxide ($K_2O$); metallic additive agents, i.e., 0.03 percent by weight of cobalt (Co); and 0.03 percent by weight of tin (Sn); were simultaneously added to tungsten powder and the mixture was sintered according to a conventional powder metallurgy. Then the sintered mass was subjected to sagging, annealing and wire drawing steps to obtain a tungsten wire of 0.18 mm diameter which was then subjected to an intermediate annealing at a temperature of 1,700° C. Thereafter the wire was drawn until a cross-sectional area reduction rate of 75 percent was obtained to obtain a wire of 0.08 mm diameter and was then subjected to the final annealing treatment at a temperature of 1,700° C to provide tungsten heater material having an elongation of 12 percent. On the heater material thus obtained was applied an alundum insulating coating and then the material was formed into a bent heater for use in type 1S2A diode tubes for high voltage rectification. This heater element could be inserted in a cathode sleeve without peeling any alundum insulating film. Moreover, it was found that the result of its forced interruption life test was also satisfactory.

Figure 16:
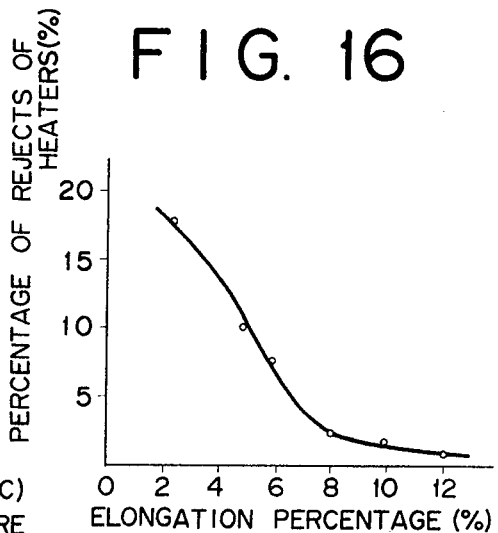
FIG. 16 is a plot showing the relation between the elongation and percentage of rejects of the novel tungsten wire.

Although in the above Example 4 a tungsten wire having an elongation of 12 percent was used to manufacture heater elements of electronic tube wires having an elongation of more than 8 percent are sufficient for this purpose as described hereinbelow. Each of tungsten wires having different elongation was used to manufacture 1,000 heater elements by the method described above, and breakage, crack and other faults occurring during shaping operations were observed. The results are shown in FIG. 16. As shown in this figure, below 8 percent, percentage of rejects is high, whereas above 8 percent, the percentage of rejects is very small.

Figure 17:
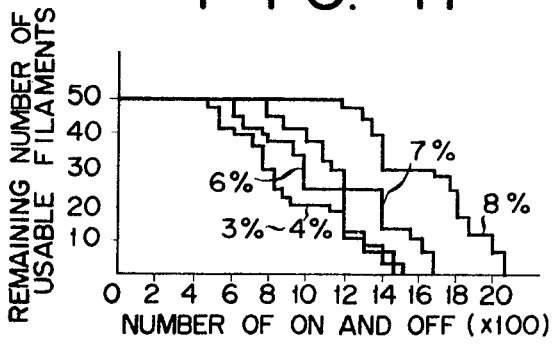
FIG. 17 is a plot showing the relation between the number of the on and off and remaining number of usable filaments.

For use as the cathode electrodes of electron tubes of the type 12AV6, for example, each of tungsten wires having a diameter of 0.2 ± 0.02 mm and elongations of 8, 7, and 6 percent respectively, and made of the prior art tungsten material having an elongation of 3 to 4 percent was respectively formed into 50 heater elements, and these heater elements were subjected to a forced interrupting life test. The comparison of the interrupting life characteristics obtained are shown in FIG. 17. From this figure it will be noted that the number of heater elements having elongations of 6 and 7 percent and remaining undamaged with respect to the number of on-off operations is comparable with that of the prior art heater elements having an elongation of 3 to 4%, under test conditions of 200 percent of the rated heater voltage and intervals of 60 seconds between on and off, this means that the useful life of the products is not improved. However the life of the heater elements having an elongation of 8 percent is greatly improved.

EXAMPLE 5

A tungsten wire added with 0.1 percent of aluminum oxide ($Al_2O_3$), 0.5 percent of silicon dioxide ($SiO_2$), 0.5 percent of potassium monoxide ($K_2O$), 0.03 percent of cobalt (Co), 0.03 percent of tin (Sn), each by weight and based upon the tungsten weight, and reduced to a diameter of 0.18 mm was subjected to an intermediate annealing at a temperature of 1,700° C, then drawn through a die until a cross-sectional area reduction rate of 56 percent was reached, or to have a diameter of 0.12 mm, subjected to the final annealing treatment at a temperature of 1,600° C and then formed into a double helical coil heater element for cathode ray tubes having an elongation of 10 percent. The workability and the results of forced interrupting life tests of the above mentioned heater element a and of a heater element b made of a prior art tungsten material (incorporated with 0.03 percent by weight of aluminum oxide ($Al_2O_3$), 0.5 percent by weight of silicon dioxide ($SiO_2$) and 0.5 percent by weight of potassium monoxide ($K_2O$) were compared. Table 4 below shows the comparison of workability when forming coils. From this table it will be noted that the percentage of reject is zero in the case of coil a embodying this invention, which shows that the tungsten wire of this invention has very good workability or is very easy to form into a desired shape.

TABLE 4

| Type of Material inferiority | This invention a | Prior art b |
|---|---|---|
| Variation in the coil outer dia. | 0% | 2% |
| Variation in the |  |  |

| | | |
|---|---|---|
| coil length dia. | 0% | 2% |
| Variation in the coil pitch | 0% | 4% |

Figure 18:
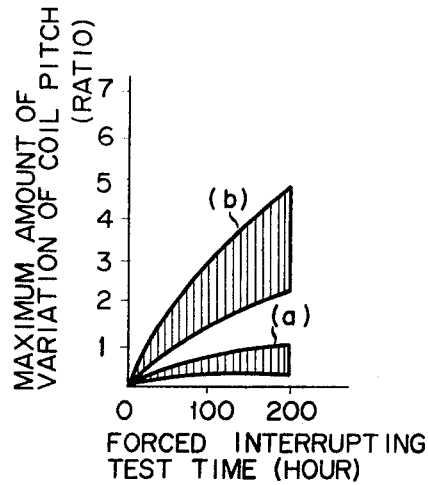
FIG. 18 is a plot comparing the forced interrupting test time viz. the maximum amount of variation of coil pitch of heaters for cathode ray tubes, respectively made of the novel tungsten material and of the prior art tungsten material.
Figure 19:
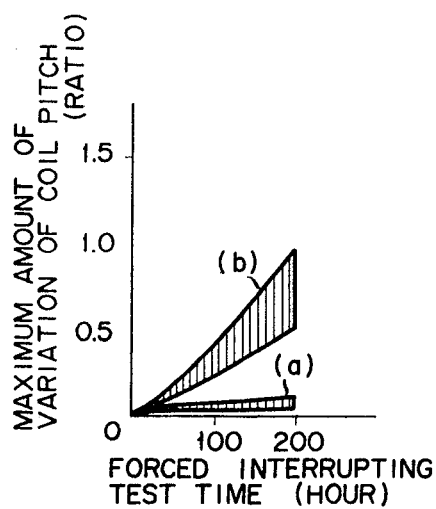
FIG. 19 is a graph showing the relation between the forced interrupting test time and the maximum amount of variation of the coil diameter.

FIGS. 18 and 19 show the results of forced life-interrupting tests wherein current was on for 1 minute under a voltage of 120 percent of the rated voltage and then turned off for 1 minute, said on and off cycles of current being repeated over an interval of 200 hours and thereafter the extent of deformation of coils was determined by X-ray photograph.

FIG. 20 shows the configuration of coils after such forced interrupting life tests over 200 hours, wherein FIG. 20a represents the configuration of a coil embodying this invention, while FIG. 20b that of a prior art coil.

As can be clearly noted from FIGS. 18 to 20 inclusive, the novel coil a has smaller extent of deformation, and has higher resistance to high temperature deformation than the prior art coil b.

In the foregoing example there was used a tungsten wire having an elongation of 10 percent. However, so long as said elongation is in excess of 8 percent, there will be obtained the same effect as shown in FIG. 21. This figure presents the results of a forced life-interrupting test conducted 200 hours on a double helical coil heater element made of tungsten wire with the elongation of said wire represented by the abscissa and a maximum variation in the coil pitch thereof by the ordinate.

EXAMPLE 6

A tungsten wire incorporated with 0.1 percent of weight of aluminum oxide ($Al_2O_3$), 0.5 percent by weight of silicon dioxide ($SiO_2$), 0.5 percent by weight of potassium monoxide ($K_2O$), 0.03 percent by weight of cobalt (Co) and 0.03 percent by weight of tin (Sn) was subjected to an intermediate annealing at a temperature of 1,700° C, drawn through a die until a cross-sectional area reduction rate of 50 percent is reached or to have a diameter of 0.13 mm and then formed into a filament having an elongation of 8 percent and used for infrared ray lamps of electric foot warmers.

The filament a thus obtained and a filament b made of a prior art tungsten wire added with 0.03 percent by weight of aluminum oxide ($Al_2O_3$), 0.5 percent by weight of silicon dioxide ($SiO_2$), and 0.5 percent by weight of potassium monoxide ($K_2O$) were respectively mounted on 10 foot warmers and each group was subjected to drop test to observe embrittlement and breakage of filaments, the result of these tests being shown in Table 5. In this table, "A" denotes the number of foot warmers the filaments of which were not broken when the foot warmers were dropped on a floor from a height of 60 cm, "B" the number of foot warmers whose filaments were not broken when the warmers were dropped from a height of 45 cm, but broken when they were dropped from a height of 60 cm, and "C" the number of foot warmers whose filaments were broken when the warmers were dropped from a height of 45 cm.

TABLE 5

| Sample | Height of drop A | B | C | Percentage of rejects (in the case of C) |
|---|---|---|---|---|
| a | 10 | 0 | 0 | 0% |
| b | 2 | 5 | 3 | 30% |

As can be clearly noted from this table the products made of the novel tungsten material have extremely large strength against shock and vibration.

While it is advantageous to use additive materials of high purity in preparing the novel tungsten material slight variation in purity is permissible since it does not affect to any appreciable extent the characteristics of the product. Thus the novel tungsten material may be made of commercially available metals containing small amounts of unavoidable impurities.

What is claimed is:

1. A sintered tungsten material comprising 0.0001 to 0.05 percent by weight of at least one metal selected from the group consisting of aluminum (Al), silicon (Si) and potassium (K) and 0.002 to 0.5 percent by weight of cobalt (Co) and the balance tungsten (W).

2. A sintered tungsten material according to claim 1 containing in total 0.0001 to 0.05 percent by weight of jointly added aluminum (Al), silicon (Si) and potassium (K) and 0.005 to 0.09 percent by weight of cobalt (Co) and particularly adapted for use as a tube wire.

3. A sintered tungsten material according to claim 1 characterized in that it can be formed into a heater element for use in an electron discharge device.

4. A sintered tungsten material according to claim 1 characterized in that it can be formed into a bulb filament.

5. A sintered tungsten material according to claim 1 characterized in that it can be formed into structural parts where the tungsten material has a high temperature ductility.

6. A sintered tungsten material according to claim 3 characterized in that it can be formed into a wire having an elongation of more than 8 percent before breakage.

* * * * *